(12) United States Patent
Barbarino et al.

(10) Patent No.: US 12,498,341 B2
(45) Date of Patent: Dec. 16, 2025

(54) ELECTRONICLESS ACCESSORY RECOGNITION USING DIELECTRIC PROPERTIES

(71) Applicant: L'Oreal, Paris (FR)

(72) Inventors: Casey Barbarino, San Anselmo, CA (US); Rafael Feliciano, New Providence, NJ (US)

(73) Assignee: L'Oreal, Paris (FR)

( * ) Notice: Subject to any disclaimer, the term of this patent is extended or adjusted under 35 U.S.C. 154(b) by 167 days.

(21) Appl. No.: 18/478,015

(22) Filed: Sep. 29, 2023

(65) Prior Publication Data
US 2025/0110074 A1   Apr. 3, 2025

(51) Int. Cl.
*G01N 27/22*   (2006.01)
*G01N 33/00*   (2006.01)

(52) U.S. Cl.
CPC ......... *G01N 27/226* (2013.01); *G01N 27/221* (2013.01); *G01N 33/0081* (2024.05)

(58) Field of Classification Search
CPC . G01N 27/226; G01N 27/221; G01N 33/0081
See application file for complete search history.

(56) References Cited

U.S. PATENT DOCUMENTS

2003/0201847 A1 * 10/2003 Lee .................... H01P 1/20345 333/204
2011/0184681 A1 * 7/2011 Augustine ............. G01R 33/12 324/654
2017/0141915 A1 * 5/2017 Aihara ............... G01R 27/2605
2020/0405173 A1 * 12/2020 Suster .................. G01N 27/026
2021/0212173 A1   7/2021 Reevell

FOREIGN PATENT DOCUMENTS

WO     2022071267 A1    4/2022

OTHER PUBLICATIONS

International Search Report and Written Opinion, issued in corresponding PCT Application No. PCT/US2024/047492, filed Sep. 19, 2024, 14 pages.

* cited by examiner

*Primary Examiner* — Alvaro E Fortich
(74) *Attorney, Agent, or Firm* — CHRISTENSEN O'CONNOR JOHNSON KINDNESS PLLC

(57) ABSTRACT

A system including a device including a processor and an electrode configured to sense a dielectric profile, and at least one accessory having a dielectric profile, where the processor is configured to receive the sensed dielectric profile from the electrode, compare the sensed dielectric profile with a profile database, where the profile database includes a plurality of dielectric profiles, and determine an identity of the accessory based on the sensed dielectric profile. Further, a method of determining an identity of an accessory, including receiving a sensed dielectric profile from the accessory with an electrode located on a device, comparing the sensed dielectric profile with a profile database, wherein the profile database includes a plurality of dielectric profiles, and determining an identity of the accessory based on the sensed dielectric profile.

19 Claims, 9 Drawing Sheets

ELECTRONICLESS ACCESSORY RECOGNITION USING DIELECTRIC PROPERTIES

SUMMARY

In one aspect, disclosed herein is a system including a device. In some embodiments the device includes a processor and an electrode configured to sense a dielectric profile. In some embodiment, the system further includes at least one accessory having a dielectric profile, where the processor is configured to receive the sensed dielectric profile from the electrode, compare the sensed dielectric profile with a profile database, the profile database including a plurality of dielectric profiles, and determine an identity of the accessory based on the sensed dielectric profile.

In some embodiments, the at least one accessory includes a housing that determines the dielectric profile. In some embodiments, the at least one accessory includes an electrical layer that determines the dielectric profile. In some embodiments, the electrical layer is a metallization layer. In some embodiments, the at least one accessory includes a dielectric layer that determines the dielectric profile. In some embodiments, the dielectric layer is a plastic layer. In some embodiments, the at least one accessory includes a metal paint layer that determines the dielectric profile.

In some embodiments, the processor is further configured to, when the dielectric profile does not match a dielectric profile of the plurality of dielectric profiles in the profile database, store the dielectric profile as a new dielectric profile.

In some embodiments, the electrode is configured to sense the dielectric profile when the accessory is in contact with the device. In some embodiments, the electrode is configured to sense the dielectric profile when the accessory is within a predetermined radius of the electrode.

In some embodiments, the dielectric profile is further based on a size of the accessory, a shape of the accessory, a material of the accessory, a material of an electrical layer or a dielectric layer, a thickness of an electrical layer or a dielectric layer, or a thickness of a paint layer of the accessory. In some embodiments, the dielectric layer, electrical layer, and/or metallic paint layer is on a portion of the accessory. In some embodiments, the dielectric layer, electrical layer, and/or metallic paint layer covers the entire accessory.

In some embodiments, the accessory further includes a capsule configured to contain a formula, wherein the formula determines the dielectric profile. In some embodiments, an amount of the formula determines the dielectric profile. In some embodiments, an absence of the formula determines the dielectric profile. In some embodiments, the type of formula determines the dielectric profile.

In another aspect, disclosed herein is a method of determining an identity of an accessory, including receiving a sensed dielectric profile from the accessory with an electrode located on a device, comparing the sensed dielectric profile with a profile database, wherein the profile database includes a plurality of dielectric profiles, and determining an identity of the accessory based on the sensed dielectric profile.

In some embodiments, the method further includes, when the dielectric profile does not match a dielectric profile of the plurality of dielectric profiles in the profile database, storing the dielectric profile as a new dielectric profile.

In some embodiments, the dielectric profile is based on a formula contained in a capsule, and the method further includes coupling the capsule to the accessory before measuring the dielectric profile. In some embodiments, the profile database includes at least a formula dielectric profile of the accessory, wherein the formula dielectric profile is when the capsule contains the formula, and an empty dielectric profile of the accessory, wherein the empty dielectric profile is when the capsule is empty. In some embodiments, the method further includes, when the dielectric profile matches the full dielectric profile, identifying that the capsule contains the formula, and when the dielectric profile matches the empty dielectric profile, identifying that the capsule does not contain formula.

In some embodiments, the method further includes placing the accessory in a predetermined radius of the device before sensing the dielectric profile. In some embodiments, the method further includes contacting the accessory with the device before sensing the dielectric profile.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Described herein is a system for determining the identity of an accessory with dielectric profile. In some embodiments, the system includes a device that can measure, with an electrode, a dielectric profile of an accessory. Based on a profile database communicatively coupled to a processor within the device, the device may compare the dielectric profile with a plurality of known dielectric profiles in the profile database to determine the identity of the accessory. In some embodiments, this may be done by coupling or contacting the accessory with the device, or by placing the accessory within a specific distance of the device. In some embodiments, when the device does not recognize the dielectric profile of the accessory, the device may store the dielectric profile as a new dielectric profile, so that the device may recognize the accessory in the future. In some embodiments, such as when the accessory includes a formula capsule, the device may be further configured to determine an amount of formula, or a type of formula located in the formula capsule based on the dielectric profile of the device.

Figure 1A:
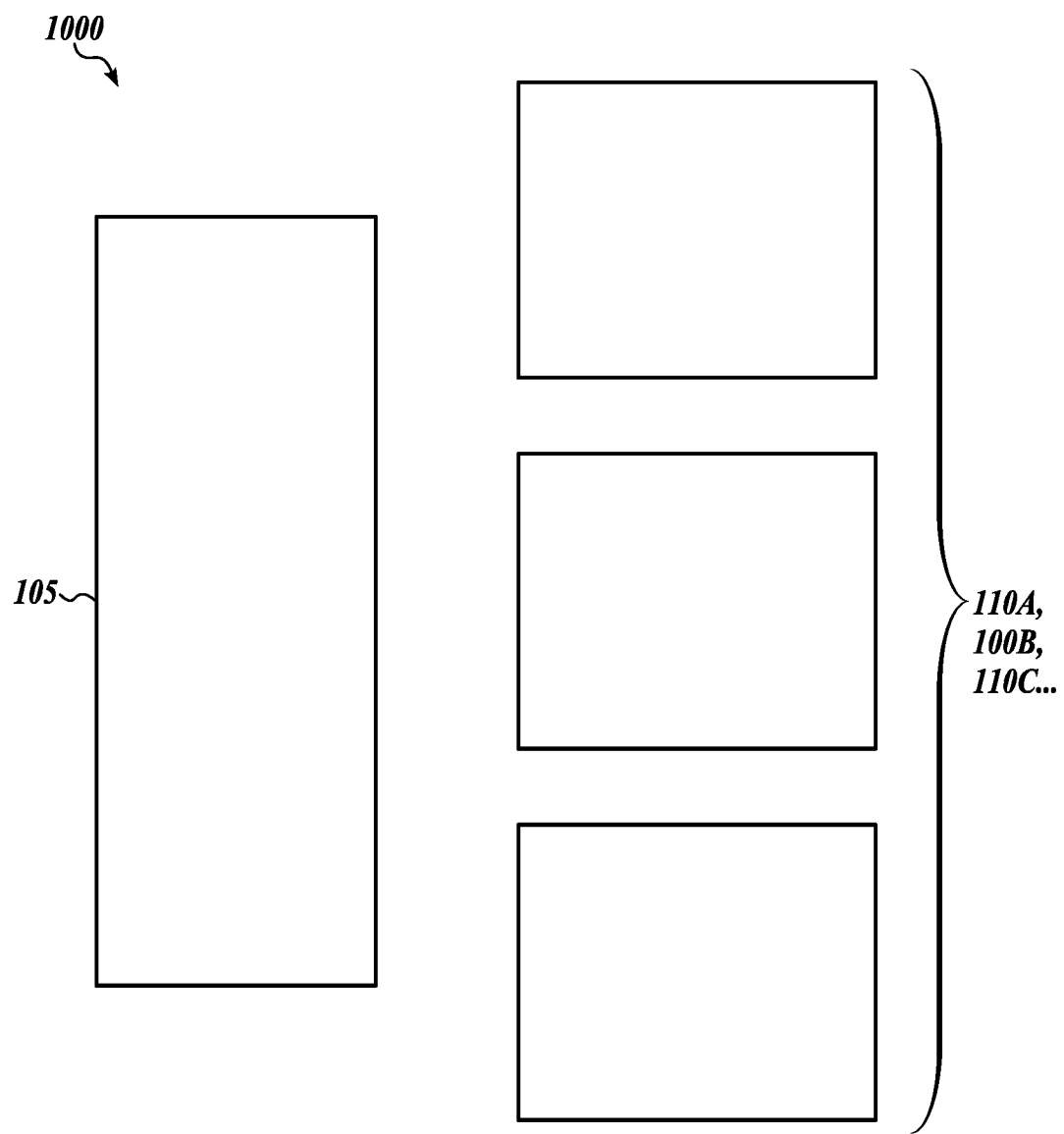
FIG. 1A is an example system including a device and a plurality of accessories, in accordance with the present technology.

FIG. 1A is an example system 1000 including a device 105 and a plurality of accessories 110A, 110B, 110C, in accordance with the present technology. In some embodiments, there may be three accessories in the plurality of accessories 110A, 110B, 110C, but one skilled in the art should recognize there may be any number of accessories in the plurality of accessories 110A, 110B, 110C, including a single accessory 110A. In some embodiments, at least one accessory 110A of the plurality of accessories 110A, 110B, 110C is configured to be coupled to or otherwise connected to the device 105. In some embodiments, the device 105 is configured to be coupled with any accessory 110A 110B, 110C, of the plurality of accessories 110A, 110B, 110C.

In operation, when the device 105 is coupled to the at least one accessory 110A, the device 105 is configured to determine an identity of the at least one accessory 110A based on a dielectric profile of the at least one accessory 110A. In some embodiments, each accessory 110A, 110B, 110C has a unique dielectric profile, allowing the device 105 to determine which accessory has been coupled to the device 105. In some embodiments, such as when the plurality of accessories 110A, 110B, 110C are the same accessory (such as in the case of replacement accessories), each accessory in the plurality of accessories 110A, 110B, 110C has the same dielectric profile. In some embodiments, because the device 105 uses the dielectric profile of the accessory to determine the identity of the at least one accessory 110A, the device does not include any additional electronics.

Figure 1B:
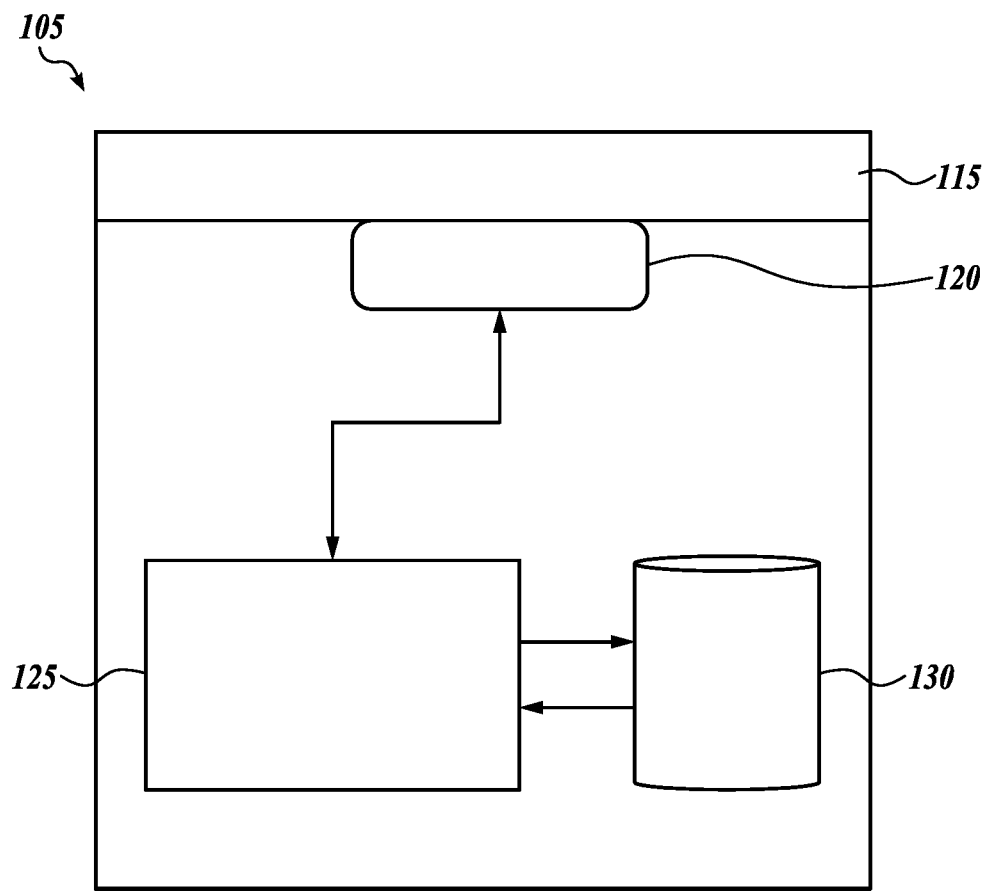
FIG. 1B is an internal view of the example device of FIG. 1A, in accordance with the present technology.

FIG. 1B is an internal view of the example device 105 of FIG. 1A, in accordance with the present technology. In some embodiments, the device 105 includes a housing 115, an electrode 120, a processor (or computer) 125, and a profile database 130.

In some embodiments, the housing 115 of the device 105 is made of a material that does not interfere with the electrode's measurement of a dielectric profile of an accessory (such as accessory 110A of FIG. 1A). In some embodiments, the housing 115 is made of plastic, metal, glass, ceramic, or the like. In some embodiments, the housing 115 covers and/or protects the electrode 120. In some embodiments, the electrode 120 may be located on an outside of the housing 115.

In some embodiments, the electrode 120 is configured to sense a dielectric profile of at least one accessory. In some embodiments, the electrode 120 is configured to sense the dielectric profile by measuring a capacitance of the accessory.

In some embodiments, the processor 125 is configured to receive the sensed capacitance measurement from the electrode 120. In some embodiments, the processor 125 communicates with the profile database 130 to determine the identity of the accessory.

The profile database 130 includes a plurality of dielectric profiles. In some embodiments, each dielectric profile of the plurality of dielectric profiles corresponds to an accessory (or type of accessory) that may be coupled to the device 105. In some embodiments, if a sensed dielectric profile is not among the plurality of the dielectric profiles, the processor 125 may further be configured to create a new dielectric profile and store the new dielectric profile in the profile database 130. In some embodiments, the plurality of dielectric profiles may include dielectric profiles that correspond with a status of a specific accessory (such as at least one accessory 110A). For example, in some embodiments, the plurality of dielectric profiles includes dielectric profiles corresponding to an amount of formula located in a capsule inside the accessory, as shown and described in FIGS. 4A-4C.

Figure 2A:
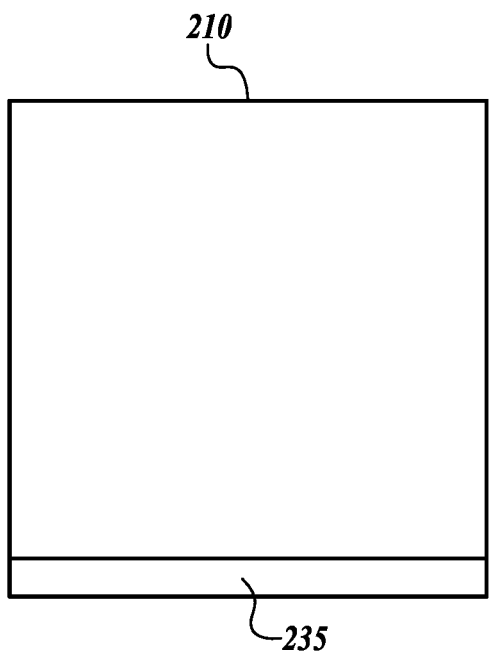
FIG. 2A is an example accessory having a dielectric profile based on a layer, in accordance with the present technology.

FIG. 2A is an example accessory 210 having a dielectric profile based on a layer 235, in accordance with the present technology. In some embodiments, the accessory 210 may have any number of features that determine the accessory's dielectric profile.

In some embodiments, the accessory 210 includes a layer 235. In some embodiments, the layer 235 determines the accessory's dielectric profile. In some embodiments, the dielectric profile is further based on a size of the accessory, a shape of the accessory, a material of the accessory, a thickness of a paint layer of the accessory, or a combination thereof. In some embodiments, the layer 235 is a dielectric layer. In some embodiments, the dielectric layer is made of plastic, such as polypropylene, polyethylene, acrylic, polyethylene terephthalate, polystyrene, polycarbonate, polyvinyl chloride, acrylonitrile butadiene styrene, HDPE (high-density polyethylene), a combination thereof, or the like. In some embodiments, the layer 235 is an electrical layer. In some embodiments, the electrical layer is a metallization layer. In some embodiments, the metallization layer is made of metal, such as tin, copper, aluminum, gold, silver, titanium, or the like.

As described herein, in some embodiments, the layer 235 is a dielectric layer. In such embodiments, the dielectric profile of accessory 210 can be mathematically represented with Equation 1.

$$f\left(\sum_{x=1}^{N} \text{Dielectric}_x\right) + \Delta \text{Threshold} \qquad \text{(Equation 1)}$$

where dielectric$_x$ is layer 235, and $\Delta$Threshold is a change in the threshold of error of a capacitance measurement of an electrode (such as electrode 120 of FIG. 1B).

In some embodiments, the layer 235 is positioned on the accessory 210 on a plane of the accessory 210 configured to interact (or couple) with a device (such as device 105 in FIG. 1A). In some embodiments, the layer 235 may cover the entire device, such as shown in FIG. 2C.

Figure 2B:
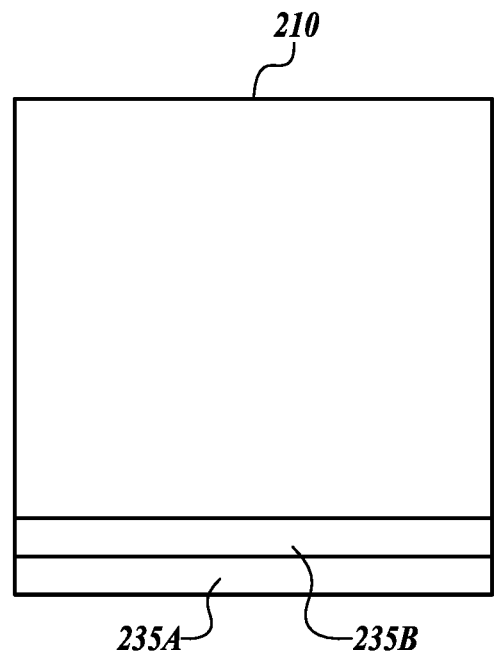
FIG. 2B is an example accessory having a dielectric profile based on multiple layers, in accordance with the present technology.
Figure 2C:
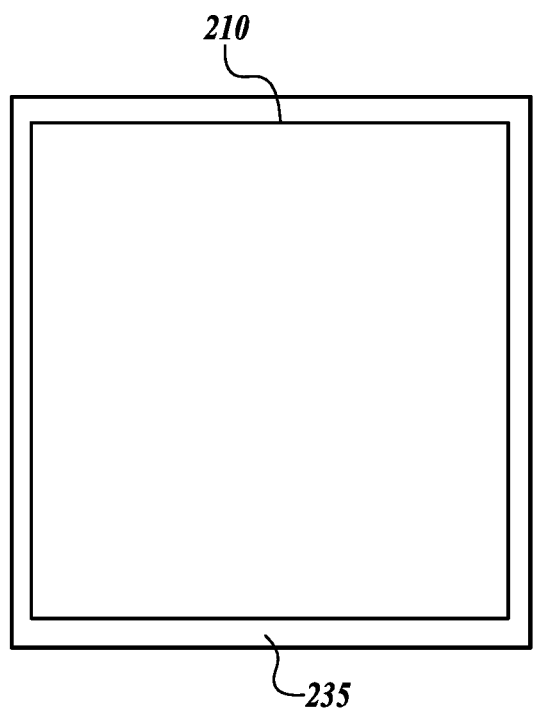
FIG. 2C is an example accessory having a dielectric profile based on a layer, in accordance with the present technology.

FIG. 2B is an example accessory 210 having a dielectric profile based on multiple layers 235A, 235B, in accordance with the present technology. In some embodiments, the accessory 210 may have more than one layer 235A, 235B. While two layers 235A and 235B are illustrated in FIG. 2B, one skilled in the art should understand that any number of layers 235A and 235B may be included on accessory 210.

In some embodiments, the multiple layers 235A, 235B determine the dielectric profile of the accessory 210. In some embodiments, the multiple layers 235A, 235B includes a first layer 235A and a second layer 235B. In some embodiments, the first layer 235A, the second layer 235B, or both the first layer 235A and the second layer 235B are dielectric layers, electrical layers, or a combination thereof. In some embodiments, the first layer 235A is a dielectric layer, and the second layer 235B is an electrical layer. In such embodiments, the dielectric profile of the accessory 210 can be mathematically represented in Equation 2.

$$f\left(\sum_{x=1}^{N} \text{Dielectric}_x + \sum_{y=1}^{N} \text{Electric}_y\right) + \Delta\text{Threshold} \quad \text{(Equation 2)}$$

where Dielectric$_x$ is layer 235A, Electric, is layer 235B, and ΔThreshold is a threshold of error of a capacitance measurement of an electrode (such as electrode 120 of FIG. 1B).

In some embodiments, multiple layers 235A 235B are positioned on the accessory 210 on a plane of the accessory 210 configured to interact (or couple) with a device (such as device 105 in FIG. 1A). In some embodiments, multiple layers 235A, 235B may cover the entire device. In some embodiments, the multiple layers 235A, 235B may be located on only a portion of the accessory 210.

FIG. 2C is an example accessory 210 having a dielectric profile based on a layer 235, in accordance with the present technology. In some embodiments, the layer 235 covers the entire accessory 210 as a coating. In some embodiments, the layer 235 may be a paint layer. In some embodiments, the layer 235 determines the dielectric profile of the accessory 210.

In some embodiments, the layer 235 may be a metal paint layer. In some embodiments, the metal paint layer may include pieces of, or granules of, metal suspended in paint. In some embodiments, the metal paint includes a plurality of metal flakes. In some embodiments, the metal paint includes a base coat, and a lacquer. In some embodiments, the lacquer may be an acrylic polyurethane topcoat.

Figure 2D:
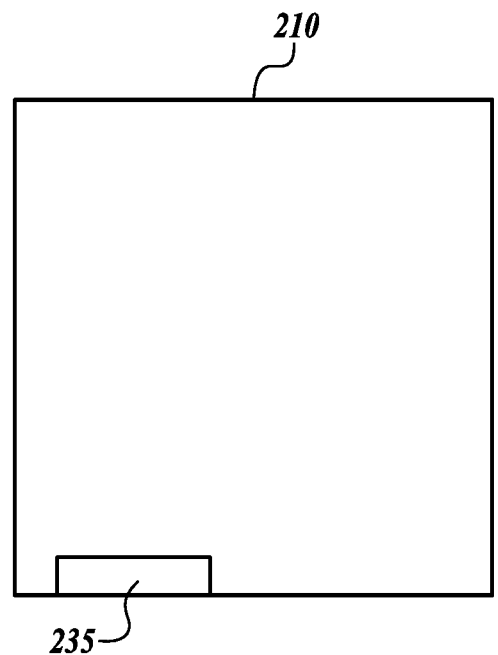
FIG. 2D is an example accessory having a dielectric profile based on a portion of the accessory, in accordance with the present technology.

FIG. 2D is an example accessory 210 having a dielectric profile based on a portion 235 of the accessory, in accordance with the present technology. In some embodiments, the dielectric profile may be based on a portion 235 of the accessory 210. In some embodiments, the portion 235 is a layer, as described in FIGS. 2A-2C. In some embodiments, the portion 235 may be a dielectric layer, an electrical layer, and/or a metallization layer. In some embodiments, the portion 235 may be a paint layer. In some embodiments, the portion 235 may be a paint, such as a metal paint. In operation, the electrode of the device (such as electrode 120) is configured to sense a dielectric profile of the just the portion of the accessory 210 to determine the identity of the accessory 210.

Figure 3A:
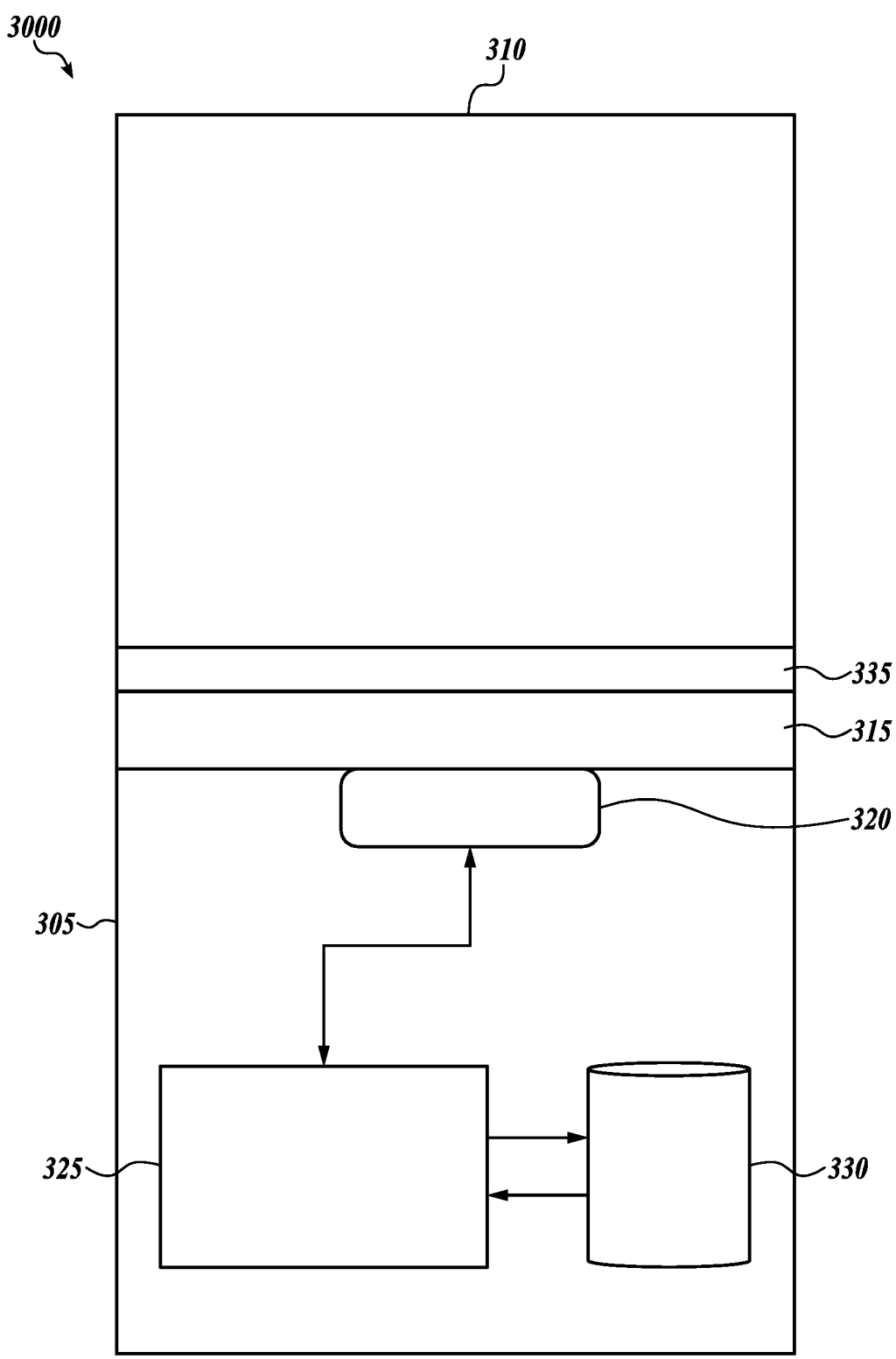
FIG. 3A shows one configuration of an example system to enable sensing a dielectric profile of an accessory with a device, in accordance with the present technology.

FIG. 3A shows one configuration of an example system 3000 to enable sensing a dielectric profile of an accessory 305 with a device 310, in accordance with the present technology. In some embodiments, system 3000 is an example of system 1000 as described herein. In some embodiments, the device 305 senses the dielectric profile of the accessory 310 when the device 305 and the accessory 310 contact one another, or couple together.

In some embodiments, the device 305 includes a housing 315, an electrode 320, a processor 325, and a profile database 330. In some embodiments, the electrode 320 is configured to sense a capacity indicative of a dielectric profile and transmit the sensed capacity to the processor 325. In some embodiments, the processor 325 communicates with a profile database including a plurality of dielectric profiles. In some embodiments, the processor 325 compares the sensed capacity with the plurality of dielectric profiles to determine an identity of the accessory with the sensed capacity.

In some embodiments, the accessory 310 includes a layer 335. In some embodiments, the layer 335 is a dielectric layer, an electric layer, or a paint layer. In some embodiments, the layer 335 determines the dielectric profile of the accessory 310.

In operation, when the accessory 310 and the device 305 touch or otherwise couple, attach, or connect with one another, the electrode 120 senses a dielectric profile from the accessory 310 in the form of a measured capacity. The electrode transmits this sensed capacity (also referred to herein as a sensed dielectric profile) to the processor 325. In some embodiments, the processor compares the sensed dielectric profile with the plurality of dielectric profiles in the profile database. If the sensed dielectric profile matches a dielectric profile of the plurality of dielectric profiles, the device 305 identifies the accessory 310 based on the matched dielectric profile.

In some embodiments, if the sensed dielectric profile does not match any dielectric profile of the plurality of dielectric profiles, the processor 325 may store the sensed dielectric profile as a new dielectric profile. In some embodiments, the processor 325 stores the new dielectric profile in the profile database 320.

Figure 3B:
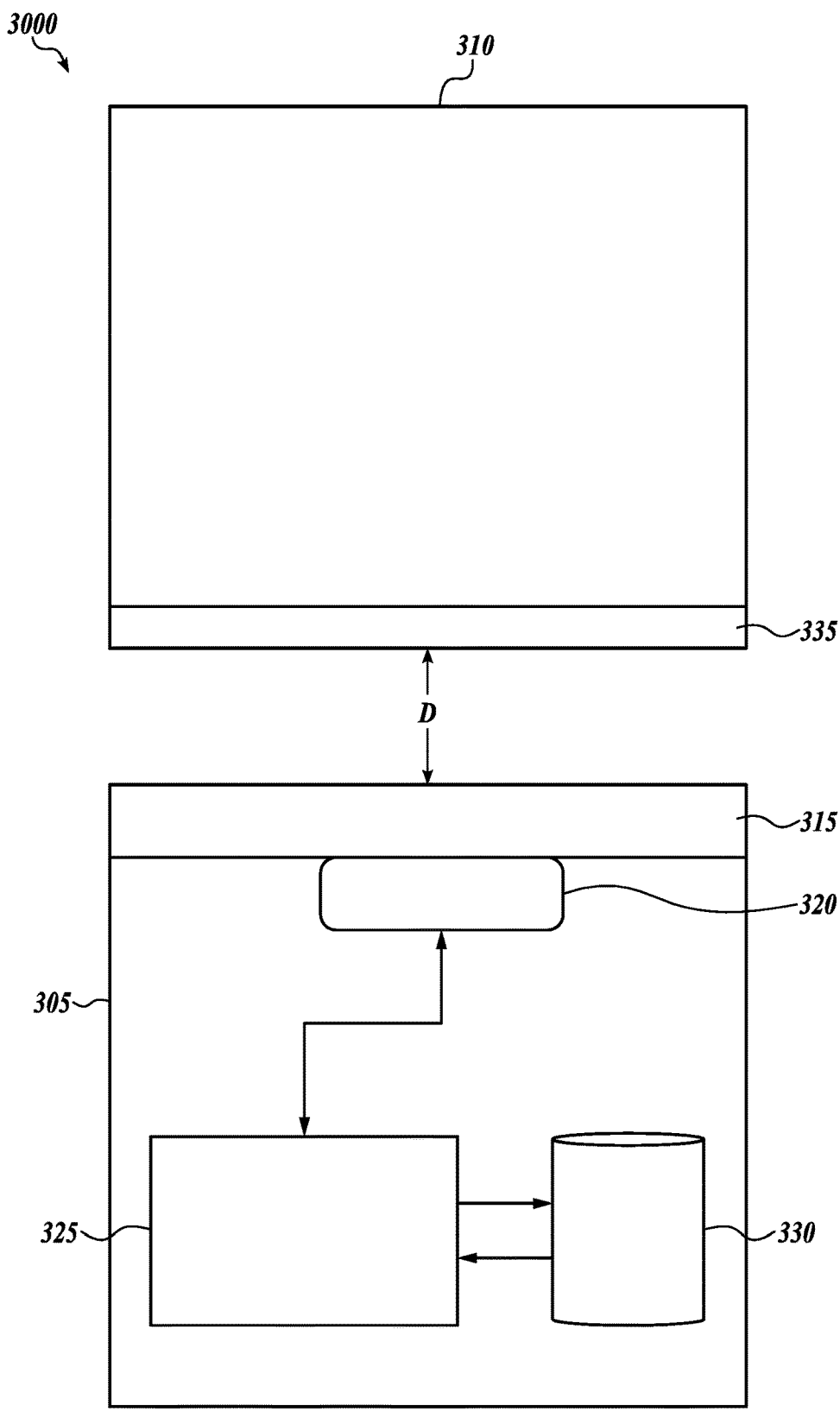
FIG. 3B shows another configuration of an example system to enable sensing a dielectric profile of an accessory with a device, in accordance with the present technology.

FIG. 3B shows another configuration of an example system to enable sensing a dielectric profile of an accessory 310 with a device 305, in accordance with the present technology. In some embodiments, system 3000 is an example of system 1000 as described herein. In some embodiments, the device 305 senses the dielectric profile of the accessory 310 when the device 305 and the accessory 310 are proximate to one another. In some embodiments, the device 305 and the accessory 310 may be within a distance D from one another.

In some embodiments, the device 305 includes a housing 315, an electrode 320, a processor 325, and a profile database 330. In some embodiments, the electrode 320 is configured to sense a capacity indicative of a dielectric profile and transmit the sensed capacity to the processor 325. In some embodiments, the processor 325 communicates with a profile database including a plurality of dielectric profiles. In some embodiments, the processor 325 compares the sensed capacity with the plurality of dielectric profiles to determine an identity of the accessory with the sensed capacity.

In some embodiments, the accessory 310 includes a layer 335. In some embodiments, the layer 335 is a dielectric layer, an electric layer, or a paint layer. In some embodiments, the layer 335 determines the dielectric profile of the accessory 310. In some embodiments, the layer 335 is a first layer, and the accessory 310 includes multiple layers.

In operation, when the accessory 310 and the device 305 come within distance D from one another, the electrode 320 senses a dielectric profile from the accessory 310 in the form of a measured capacity. The electrode transmits this sensed capacity (also referred to herein as a sensed dielectric profile) to the processor 325. In some embodiments, the processor compares the sensed dielectric profile with the plurality of dielectric profiles in the profile database. If the sensed dielectric profile matches a dielectric profile of the plurality of dielectric profiles, the device 305 identifies the accessory 310 based on the dielectric profile.

In some embodiments, if the sensed dielectric profile does not match any dielectric profile of the plurality of dielectric profiles, the processor 325 may store the sensed dielectric profile as a new dielectric profile. In some embodiments, the processor 325 stores the new dielectric profile in the profile database.

In some embodiments, depending on the sensitivity of electrode 320, the device 305 and the accessory 310 may be placed within a distance D from one another, and the electrode 320 is still be able to sense the dielectric profile of the accessory. In some embodiments, the distance D between the device 305 and the accessory 310 is between about 0.1 cm and 1 meter. In some embodiments, the distance D is between about 0.1 cm and 31 cm. In some embodiments, the distance D is between about 0.1 cm and 10 cm.

Figure 4C:
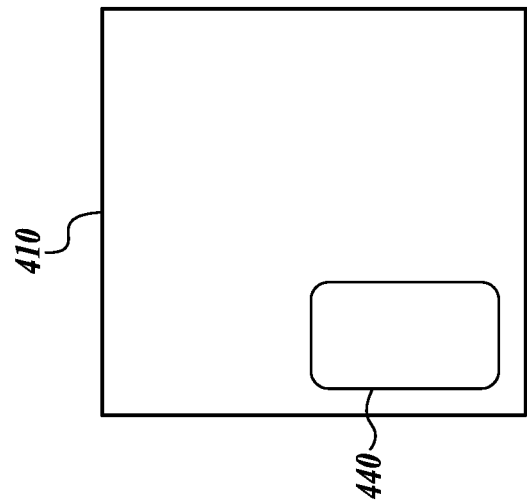
FIGS. 4A-4C are example accessories having a formula capsule that determines a dielectric profile of each accessory, in accordance with the present technology.
Figure 4B:
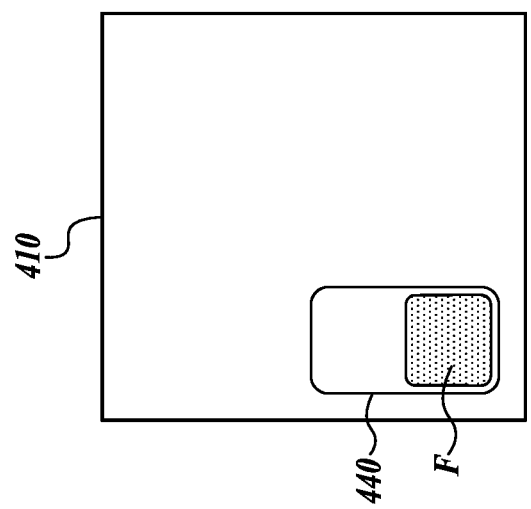
Figure 4A:
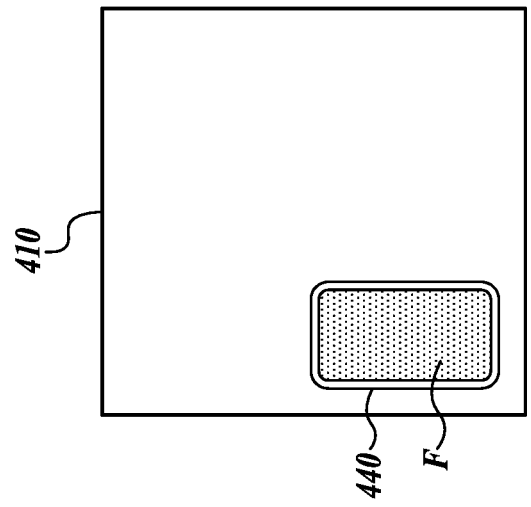

FIGS. 4A-4C are example accessories 410 having a formula capsule (or capsule) 440 that determines a dielectric profile of each accessory, in accordance with the present technology. In some embodiments, the accessory 410 (which may be any accessory described herein, including accessory 110, 210, 310) includes a formula capsule 440, configured to hold a formula F.

In some embodiments, the capsule 440 is configured to be inserted within the accessory 410, but in other embodiments, the capsule 440 may be attached to, coupled with, placed next to, or slid into the accessory 410. The capsule 440 may be recyclable or a single use capsule. In some embodiments, the capsule 440 may be refilled.

In some embodiments, an amount of formula F within the formula capsule 440 determines the dielectric profile of the accessory (also referred to herein as a "formula dielectric profile"). For example, FIG. 4A shows a formula capsule 440 full of formula F. In some embodiments, the accessory 410 of FIG. 4A has a full dielectric profile, identifying that the capsule 440 has been filled with formula F. In some embodiments, the full dielectric profile may indicate that the formula capsule 440 is completely filled with formula F, as shown in FIG. 4A, but in other embodiments, the full dielectric profile is when any amount of formula F is located within the capsule 440. In such embodiments, accessory 410 of FIG. 4B would also have a full dielectric profile. In some embodiments, the full dielectric profile is when the formula capsule 440 is substantially filled with formula F, such as when the formula capsule 440 is about 80%, 90%, 95% or the like, filled with formula F.

In some embodiments, an electrode (such as electrode 120, 320) of a device (such as device 105, 305) has a sensitivity that is high enough to distinguish between a completely full formula capsule 440 (FIG. 4A) and a partially full formula capsule 440 (FIG. 4B). In such embodiments, the accessory 410 of FIG. 4B would have a partial dielectric profile. In some embodiments, a profile database (such as profile database 320) includes one or more partial dielectric profiles, each associated with a fill level of the formula capsule 440. For example, the profile database may include a 25% full dielectric profile, a 50% dielectric profile, and a 75% dielectric profile. In some embodiments, the device (such as device 105, 305) is further configured to display or otherwise alert a user to the fill level of the formula capsule 440.

FIG. 4C shows an accessory 410 with an empty formula capsule 440 (i.e., having no formula F within it). In some embodiments, accessory 410 of FIG. 4C has an empty dielectric profile. In some embodiments, the empty dielectric profile may include when the formula capsule 440 contains only a small amount of formula F, such as when the formula capsule is about 1%, 2%, or 5%, filled with formula F.

In some embodiments, the device (such as device 105, 305) may sense the dielectric profile of the accessory 410 and determine if the formula capsule 440 is full, partially full, or empty. In some embodiments, a profile database (such as profile database 130, 330) includes the full dielectric profile, the partial dielectric profile, and/or the empty dielectric profile. In operation, when the electrode senses the dielectric profile of the accessory 410, the device can recognize how much or about how much formula F is located in the formula capsule 440. In some embodiments, the device can further alert a user of the system to replace an empty formula capsule 440 or refill the empty formula capsule 440.

In some embodiments, the type of formula further determines the dielectric profile of the accessory 410. For example, a conditioner formula may alter the dielectric profile in a different manner than an eye makeup formula or a moisturizer formula. In this manner, the device can identify the type of formula located inside the formula capsule 440 based on the type of formula F.

Figure 5:
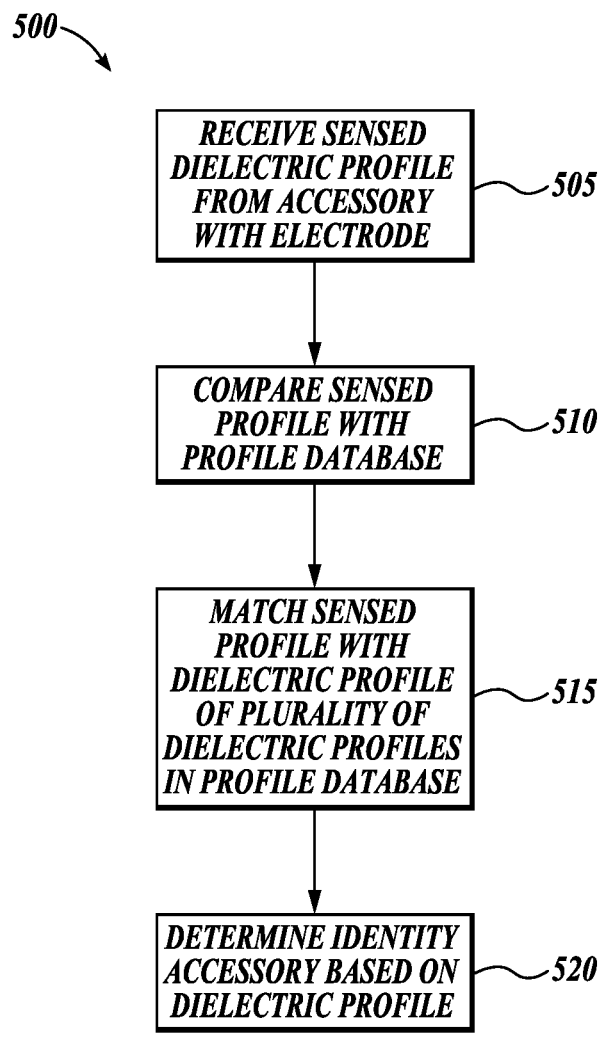
FIG. 5 is a method of determining an identity of an accessory, in accordance with the present technology.

FIG. 5 is a method 500 of determining an identity of an accessory, in accordance with the present technology. In some embodiments, the method 500 is carried out with the systems described herein, such as system 1000 and/or 3000. In some embodiments the method is carried out by a device (such as device 105, 305) and at least one accessory (such as accessory 110A, 210, 310, 410).

In block 505, a sensed dielectric profile is received from an electrode (such as electrode 120, 320) from an accessory. In some embodiments, the electrode is incorporated into a device. In some embodiments, the electrode is configured to sense the capacitance of the accessory as the dielectric profile.

In block 510, the sensed dielectric profile is compared with a profile database (such as profile database 135, 335). In some embodiments, the profile database includes a plurality of dielectric profiles. In some embodiments, each dielectric profile of the plurality of dielectric profiles corresponds to a unique accessory. In some embodiments, the sensed dielectric profile is compared to the plurality of dielectric profiles in the profile database.

In block 515, the sensed dielectric profile is matched with a dielectric profile of the plurality of dielectric profiles in the profile database.

In block 520, the identity of the accessory is determined based on the sensed dielectric profile. In some embodiments, each dielectric profile of the plurality of dielectric profiles is associated with an identity of a unique accessory. By matching the sensed dielectric profile, the device can determine the identity of the accessory.

Figure 6:
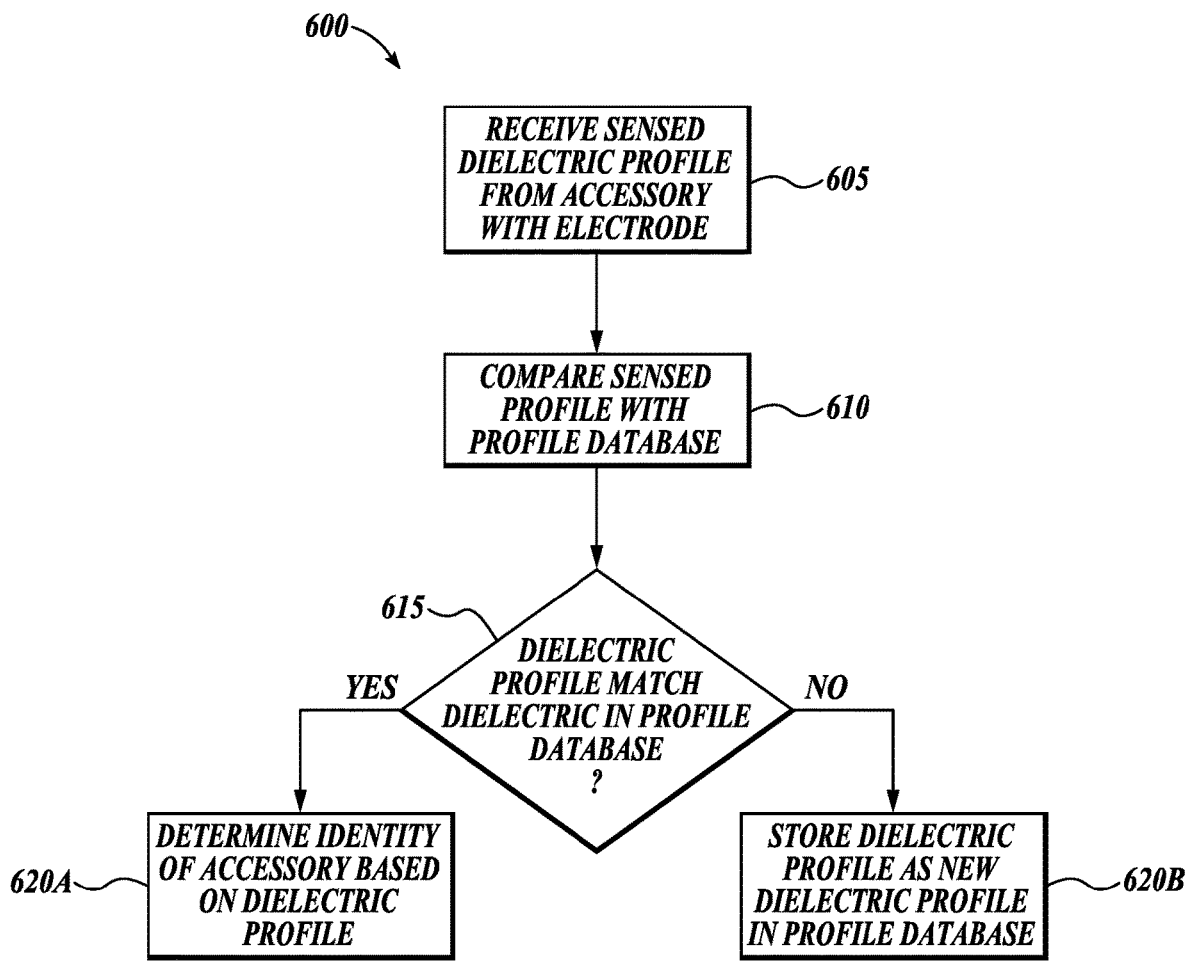
FIG. 6 is another method of determining an identity of an accessory, in accordance with the present technology.

FIG. 6 is another method 600 of determining an identity of an accessory, in accordance with the present technology. In some embodiments, the method 500 is carried out with the systems described herein, such as system 100 and 300. In some embodiments the method is carried out by a device (such as device 105, 305) and at least one accessory (such as accessory 110A, 210, 310).

In block 605, a sensed dielectric profile is received from an electrode (such as electrode 120, 320) from an accessory. In some embodiments, the electrode is incorporated into a device. In some embodiments, the electrode is configured to sense the capacitance of the accessory as the dielectric profile.

In block 610, the sensed dielectric profile is compared with a profile database (such as profile database 135, 335).

In some embodiments, the profile database includes a plurality of dielectric profiles. In some embodiments, each dielectric profile of the plurality of dielectric profiles corresponds to a unique accessory. In some embodiments, the sensed dielectric profile is compared to the plurality of dielectric profiles in the profile database.

In decision block 615, it is determined whether the sensed dielectric profile matches one dielectric profile of the plurality of dielectric profiles in the profile database. If the sensed dielectric profile matches one dielectric profile of the plurality of dielectric profiles in the profile database, the method proceeds to block 620A.

In block 620A, the identity of the accessory is determined based on the sensed dielectric profile. In some embodiments, each dielectric profile of the plurality of dielectric profiles is associated with an identity of a unique accessory. By matching the sensed dielectric profile, the device can determine the identity of the accessory.

Returning to decision block 615, if the sensed dielectric profile does not match a dielectric profile of the plurality of dielectric profiles in the profile database, the method proceeds to block 620B.

In block 620B, the sensed dielectric profile is stored as a new dielectric profile in the profile database. In this manner, the profile database can expand based on the accessories coupled to or in contact with the device. In some embodiments, the profile database stores this sensed dielectric profile so that the device can recognize and identify the identity of the accessory at a future time.

Figure 7:
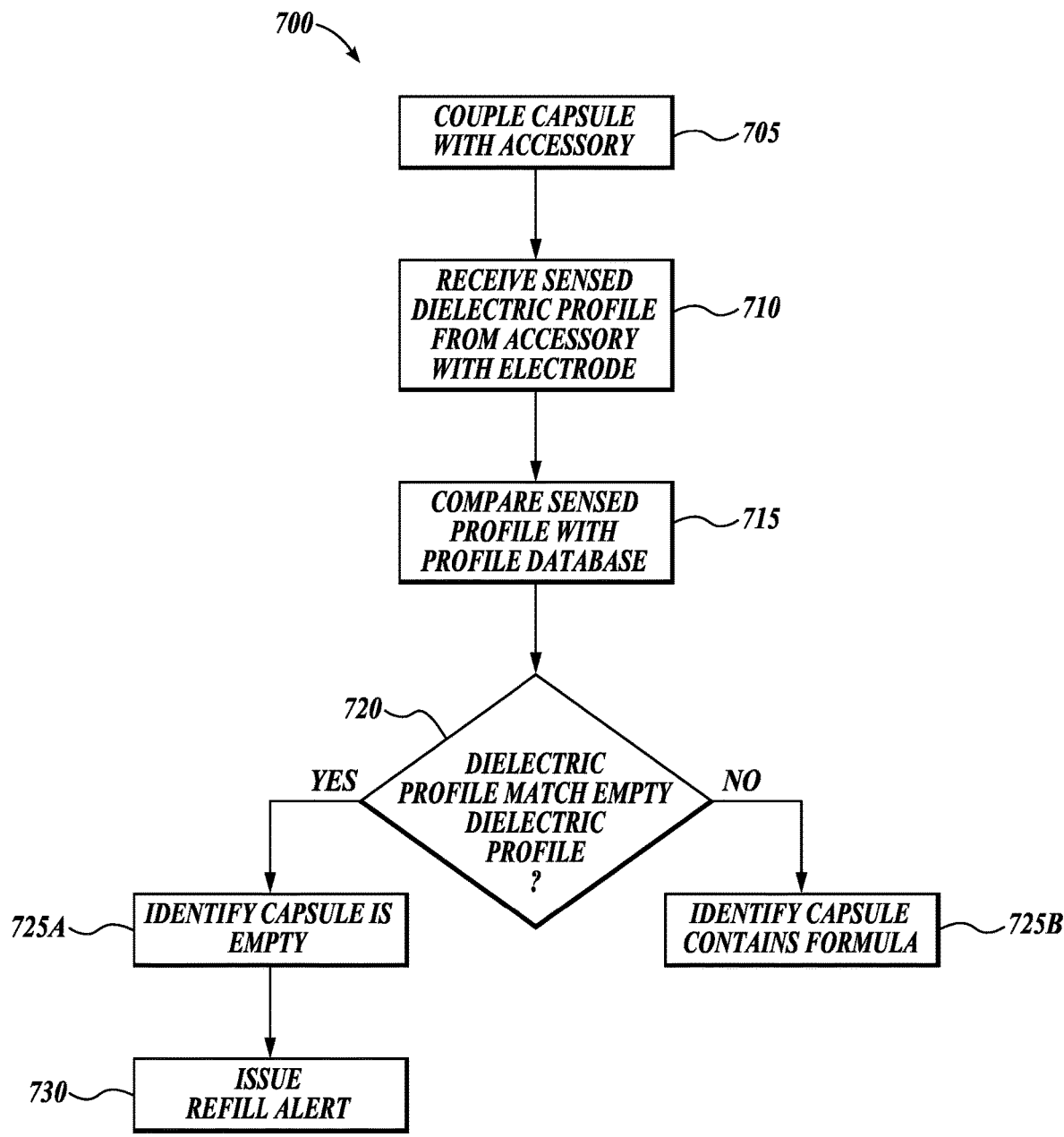
FIG. 7 is another method of determining an identity of an accessory, in accordance with the present technology.

FIG. 7 is another method 700 of determining an identity of an accessory, in accordance with the present technology. In some embodiments, the method 500 is carried out with the systems described herein, such as system 100, 400, and/or 400. In some embodiments the method is carried out by a device (such as device 105, 305) and at least one accessory (such as accessory 110A, 210, 310, 410).

In block 705, a capsule (such as formula capsule 440) is coupled with the accessory. In some embodiments, the capsule may be inserted into the accessory, attached to the accessory, coupled with the accessory, or otherwise physically connected with the accessory.

In block 710, the device receives a sensed dielectric profile from the accessory with an electrode (such as electrode 110, 310). In some embodiments, the dielectric profile is informed by a type or amount of formula (such as formula F) located inside the capsule.

In block 715, the sensed dielectric profile is compared with a profile database (such as profile database 330). In some embodiments, the profile database includes an empty dielectric profile, associated with an accessory having an empty formula capsule. In some embodiments, the profile database includes at least a dielectric profile associated with a capsule full of formula (full dielectric profile) and a dielectric profile associated with an empty capsule (empty dielectric profile). In some embodiments, the full dielectric profile is when any amount of formula is located within the capsule. In other embodiments, the full dielectric profile is when the capsule is substantially filled, such as when the capsule is 90%, 95%, or 100% filled with formula. In some embodiments, the electrode is sensitive enough to discern when the capsule is partially filled. In such embodiments, the profile database may include one or more partial dielectric profiles, each corresponding to a fill level of the formula capsule. For example, there may be a 25% full dielectric profile, a 50% full dielectric profile, and the like.

In decision block 720, it is determined whether the dielectric profile matches the empty dielectric profile. If the dielectric profile matches the empty dielectric profile, the method 700 proceeds to block 725A.

In block 725A, the device identifies that the capsule is empty,

Optionally, in block 730, the device issues a refill alert. In some embodiments, the refill alert may be to replace the entire capsule. In some embodiments, the refill alert is to refill the capsule with formula.

Returning to decision block 720, if it is determined that the dielectric profile does not match the empty dielectric profile, the method 700 proceeds to block 725B.

In block 725B, the device recognizes that the capsule contains formula. In some embodiments, the capsule displays or otherwise alerts a user of the system that the capsule contains formula, such as by displaying an indicator, making a noise, or flashing a light. In some embodiments, such as when the profile database includes one or more partial dielectric profiles, the device may alert or display a fill amount (such as 25%).

It should be understood that all methods 500, 600, 700 should be interpreted as merely representative. In some embodiments, process blocks of all methods 500, 600, 700 may be performed simultaneously, sequentially, in a different order, or even omitted, without departing from the scope of this disclosure.

The present application may reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

While illustrative embodiments have been illustrated and described, it will be appreciated that various changes can be made therein without departing from the spirit and scope of the invention.

We claim:

1. A system comprising:
   a device including a processor and an electrode configured to sense a dielectric profile by measuring a capacitance; and
   at least one accessory having the dielectric profile determined in part by a capsule containing a cosmetic formula,
   wherein the processor is configured to:
      receive the sensed dielectric profile from the electrode;
      compare the sensed dielectric profile with a profile database, wherein the profile database includes a plurality of dielectric profiles;
      determine an identity of the at least one accessory based on the sensed dielectric profile;
      determine a fill level of the formula capsule; and
      issue an alert based on the fill level of the formula capsule.

2. The system of claim 1, wherein the at least one accessory includes a housing that further determines the dielectric profile.

3. The system of claim 1, wherein the at least one accessory includes an electrical layer that further determines the dielectric profile.

4. The system of claim 3, wherein the electrical layer is a metallization layer.

5. The system of claim 1, wherein the at least one accessory includes a dielectric layer that further determines the dielectric profile.

6. The system of claim 5, wherein the dielectric layer is a plastic layer.

7. The system of claim 1, wherein the at least one accessory includes a metal paint layer that further determines the dielectric profile.

8. The system of claim 1, wherein the processor is further configured to:
   when the dielectric profile does not match any dielectric profile of the plurality of dielectric profiles in the profile database,
   store the dielectric profile as a new dielectric profile.

9. The system of claim 1, wherein the electrode is configured to sense the dielectric profile when the accessory is in contact with the device.

10. The system of claim 1, wherein the electrode is configured to sense the dielectric profile when the accessory is within a predetermined radius of the electrode.

11. The system of claim 1, wherein the dielectric profile is further based on a size of the accessory, a shape of the accessory, a material of the accessory, a material of an electrical layer or a dielectric layer, a thickness of an electrical layer or a dielectric layer, a thickness of a paint layer of the accessory, or a combination thereof.

12. The system of claim 11, wherein the dielectric layer, electrical layer, and/or metallic paint layer is on a portion of the accessory.

13. The system of claim 11, wherein the dielectric layer, electrical layer, and/or metallic paint layer covers the entire accessory.

14. A method of determining an identity of an accessory, comprising:
- coupling a capsule to the accessory before measuring the dielectric profile;
- receiving a sensed dielectric profile from the accessory with an electrode located on a device, wherein the dielectric profile is based on a cosmetic formula contained in the capsule;
- comparing the sensed dielectric profile with a profile database, wherein the profile database includes a plurality of dielectric profiles;
- determining an identity of the accessory based on the sensed dielectric profile;
- determining a fill level of the capsule based on the sensed dielectric profile; and
- issuing an alert based on the fill level of the capsule.

15. The method of claim 14, further comprising:
when the dielectric profile does not match a dielectric profile of the plurality of dielectric profiles in the profile database,
storing the dielectric profile as a new dielectric profile.

16. The method of claim 15, wherein:
the dielectric profile is based on a formula contained in a capsule, and
the method further comprises coupling the capsule to the accessory before measuring the dielectric profile.

17. The method of claim 16, wherein:
the profile database includes at least:
- a formula dielectric profile of the accessory, wherein the formula dielectric profile is when the capsule contains the formula; and
- an empty dielectric profile of the accessory, wherein the empty dielectric profile is when the capsule is empty, wherein the method further comprises:
- when the dielectric profile matches the full dielectric profile, identifying that the capsule contains the formula; and
- when the dielectric profile matches the empty dielectric profile, identifying that the capsule does not contain formula.

18. The method of claim 14, wherein the method further includes placing the accessory in a predetermined radius of the device before sensing the dielectric profile.

19. The method of claim 14, wherein the method further includes contacting the accessory with the device before sensing the dielectric profile.

* * * * *